US010904432B2

(12) United States Patent
Arbeiter et al.

(10) Patent No.: US 10,904,432 B2
(45) Date of Patent: Jan. 26, 2021

(54) PANORAMIC VIEW SYSTEM FOR A VEHICLE

(71) Applicant: Conti Temic microelectronic GmbH, Nuremberg (DE)

(72) Inventors: Georg Arbeiter, Kueps (DE); Stefan Milz, Sallburg-Ebersdorf (DE); Johannes Petzold, Kulmbach (DE); Joerg Schrepfer, Tettau (DE); Sudhan Dhana Sekaran, Bamberg (DE); Rodrigo Garcia Marques, Bamberg (DE)

(73) Assignee: Conti Ternie microelectronic GmbH, Nuremberg (DE)

( * ) Notice: Subject to any disclaimer, the term of this patent is extended or adjusted under 35 U.S.C. 154(b) by 0 days.

(21) Appl. No.: 16/469,330

(22) PCT Filed: Oct. 25, 2017

(86) PCT No.: PCT/DE2017/200113
§ 371 (c)(1),
(2) Date: Jun. 13, 2019

(87) PCT Pub. No.: WO2018/108213
PCT Pub. Date: Jun. 21, 2018

(65) Prior Publication Data

US 2020/0112675 A1 Apr. 9, 2020

(30) Foreign Application Priority Data

Dec. 15, 2016 (DE) ........................ 10 2016 225 066

(51) Int. Cl.
*H04N 5/232* (2006.01)
*G06T 3/40* (2006.01)

(52) U.S. Cl.
CPC ....... *H04N 5/23238* (2013.01); *G06T 3/4038* (2013.01); *B60R 2300/102* (2013.01)

(58) Field of Classification Search
CPC ...................... H04N 5/23238; B60R 2300/308
See application file for complete search history.

(56) References Cited

U.S. PATENT DOCUMENTS 9,802,538 B2 10/2017 Augst
2004/0260469 A1 12/2004 Mizusawa
(Continued)

FOREIGN PATENT DOCUMENTS

DE 102010038939 2/2011
EP 1 170 173 1/2002
GB 2 361 376 10/2001

OTHER PUBLICATIONS

English translation of the International Search Report of the International Searching Authority for International Application PCT/DE2017/200113, dated Jan. 23, 2018, 2 pages, European Patent Office, HV Rijswijk, Netherlands.
(Continued)

*Primary Examiner* — Rowina J Cattungal
(74) *Attorney, Agent, or Firm* — W. F. Fasse

(57) ABSTRACT

A vehicle's panoramic view system includes a non-centered real camera that captures an image of surroundings, a virtual camera, an image processing unit, and a display unit that displays a geometric form overlaid over the captured image. The image processing unit projects the captured image onto a first plane perpendicular to the real camera to correct perspective distortions resulting from the camera's non-centered position, and projects the geometric form onto a second plane perpendicular to the virtual camera to represent the geometric form without distortion on the display unit. The image processing unit finds an affine transformation between the first and second planes by delta transformation
(Continued)

8
8''
8'
9
10
11
12
13
T
7
2 between the real and virtual cameras, and applies the affine transformation to the first plane containing the projected distortion-corrected captured image, to align a modified representation of the image with the undistorted geometric form in the second plane.

13 Claims, 2 Drawing Sheets

(56) References Cited

U.S. PATENT DOCUMENTS

2005/0012685 A1 1/2005 Okada et al.
2008/0136912 A1* 6/2008 Iwano .................. G06T 1/0007 348/148
2011/0032374 A1 2/2011 Imanishi et al.
2012/0300075 A1 11/2012 Yamamoto et al.
2014/0104424 A1* 4/2014 Zhang ...................... B60R 1/00 348/148
2014/0111637 A1* 4/2014 Zhang .................... B60R 1/088 348/118
2014/0114534 A1* 4/2014 Zhang ...................... B60R 1/00 701/42
2014/0152778 A1 6/2014 Ihlenburg et al.
2014/0278049 A1 9/2014 Grewe et al.
2014/0278065 A1 9/2014 Ren
2015/0042799 A1* 2/2015 Zhang ............... G06K 9/00805 348/148
2015/0109444 A1* 4/2015 Zhang ................... B60Q 9/008 348/148
2015/0110420 A1 4/2015 Li et al.
2016/0311374 A1 10/2016 May
2017/0259831 A1 9/2017 Hoshino et al.
2017/0358056 A1* 12/2017 Higuchi ................... G06T 1/00
2018/0040103 A1 2/2018 Esparza Garcia et al.
2019/0311523 A1 10/2019 Milz et al.

OTHER PUBLICATIONS

PCT International Preliminary Report on Patentability including English Translation of PCT Written Opinion of the International Searching Authority for International Application PCT/DE2017/200113, dated Jun. 18, 2019, 8 pages, International Bureau of WIPO, Geneva, Switzerland.
German Search Report for German Patent Application No. 10 2016 225 066.3, dated May 9, 2017, 7 pages, German Patent and Trademark Office, Muenchen, Germany, with partial English translation, 5 pages.
Nick Michiels et al., "Interactive Augmented Omnidirectional Video with Realistic Lighting", In: "Lecture Notes on Computer Science, vol. 8853", Augmented and Virtual Reality Conference (AVR 2014), Sep. 17, 2014, XP047302733, ISBN: 978-3-642-27168-7, ISSN: 0302-9743, pp. 247 to 263.
Mengmeng Yu et al., "A Visual Parking Guidance for Surround View Monitoring System", 2015 IEEE Intelligent Vehicles Symposium (IV), Jun. 28, 2015, XP055418725, ISBN: 978-1-4673-7266-4, pp. 53 to 58.
Seiya Shimizu et al., "Wraparound View System for Motor Vehicles", Fujitsu Scientific and Technical Journal, vol. 46, No. 1, Jan. 2010, XP055349887, ISSN: 0016-2523, pp. 95 to 102.

* cited by examiner

PANORAMIC VIEW SYSTEM FOR A VEHICLE

FIELD OF THE INVENTION

The invention relates to a panoramic view system for a vehicle. The invention further relates to a method for representing a panoramic view of the surroundings of the vehicle, and to a program element and a computer-readable medium for carrying out the method.

BACKGROUND INFORMATION

Representations on display units of a panoramic view system typically include a projected image of a real camera which is mounted on a vehicle and takes pictures of the surroundings of the vehicle. Furthermore, geometric forms are laid as an overlay over the projected image of the camera, wherein the geometric forms can be e.g. a trajectory of the vehicle. In this case, the projected image of the camera must fit the overlay. If, however, the camera is mounted non-centrically on the vehicle, either the overlay or the image of the camera appears distorted. Such a distorted appearance is not desired.

SUMMARY OF THE INVENTION

It is therefore an object of the present invention to provide a panoramic view system and a method of the type indicated above, which make it possible for both the overlay and the image of the camera to be represented in an undistorted manner and aligned with one another in the envisaged manner on a display unit of the vehicle.

The above object can be achieved by the subject-matter of the independent claim or claims. Advantageous embodiments are the subject-matter of the dependent claims, the following description as well as the figures.

According to a first aspect of the invention, a panoramic view system for a vehicle is provided.

The panoramic view system comprises at least one physical or real camera for capturing an image of the surroundings of the vehicle from a non-centered position. The real camera is preferably a digital camera which can capture images or record film of the surroundings of the vehicle and can store, output and transfer data representing the images acquired or respectively the film. The panoramic view system can also comprise multiple, e.g. four, real cameras which can be mounted on the vehicle in such a manner that individual images of the multiple real cameras can be combined into an entire all-round image (e.g. a 360° all-round image of the vehicle). The at least one real camera is in particular set up to capture a plurality of images of the surroundings of the vehicle from a non-centered position. Even if the present invention is explained in connection with the acquisition of a single image of a single camera, the explanations also apply nevertheless to the other images from the non-centered position of the surroundings of the vehicle of the plurality of images which can be captured by means of at least one real camera. The feature "non-centered position" can, in this connection, in particular mean that the camera is mounted eccentrically and obliquely on or in the vehicle with respect to an imaginary longitudinal axis of the vehicle, and can detect a region ahead of the vehicle.

Furthermore, the panoramic view system comprises a virtual camera, an image processing unit and a display unit. The image processing unit is, on the one hand, communicatively connected to the real camera. On the other hand, the image processing unit is also communicatively connected to the display unit. In this way, the real camera can in particular transmit image data to the image processing unit, the image processing unit can process the image data and transfer the processed image data to the display unit. The image processing unit can be implemented in a software-based manner.

The display unit is, on the one hand, set up to represent the image captured by the real camera in a projected manner. On the other hand, the display unit is likewise set up to represent, in a projected manner, at least one geometric form as an overlay over the image captured by the real camera.

The image processing unit is set up to project the image captured by the real camera onto a first surface or plane which is perpendicular to the real camera such that perspective distortions in the image captured by the real camera resulting from the non-centered position of the real camera are distortion-corrected.

Furthermore, the image processing unit is set up to project the at least one geometric form onto a second surface or plane which is perpendicular to the virtual camera such that the at least one geometric form is represented in an undistorted manner on the display unit. Consequently, the real camera structurally and physically exists, whereas the virtual camera is merely imaginary or finds its way into the image represented on the display unit and represents a virtual perspective of a user of the panoramic view system according to the invention or of a vehicle having the panoramic view system according to the invention. The second plane is that plane which is represented on the display unit, e.g. on a monitor in the region of the instrument panel of the vehicle, and is visible to a user of the vehicle.

The image processing unit is further set up to find an affine transformation between the first plane and the second plane by means of a delta transformation between the real camera and the virtual camera, and to apply the found affine transformation to the first plane which contains the projected and distortion-corrected image of the real camera captured by the real camera, such that a modified representation of the distortion-corrected image (which is contained in the first Plane) of the real camera is aligned with the at least one undistorted geometric form in the second plane.

The delta transformation considers the deviations of the real camera from the virtual camera with respect to the extrinsic camera parameters and the intrinsic camera parameters. To ensure that objects within the image, which is captured by the real camera, are not represented obliquely in the second plane, which would be correct in terms of perspective, it is in particular considered in the case of the delta transformation that the real camera is mounted non-centrically on the vehicle.

The image of the camera, which has been projected in a distortion-corrected manner onto the first plane, is artificially distorted in this way by means of the affine transformation as if it had been captured from a position of the virtual camera. This makes it possible to represent objects, which are contained in the image captured by the real camera, in the second plane in a distortion-corrected manner and, at the same time, to make possible an undistorted representation of at least one geometric form, e.g. a trajectory of the vehicle, as an overlay in the second plane, wherein the objects and the at least one geometric form are correctly aligned with one another in the second plane.

According to a second aspect of the invention, a vehicle is provided, which comprises a panoramic view system according to the first aspect of the invention, wherein the real camera is mounted non-centrally on the vehicle. The vehicle is, for example, a motor vehicle such as a car, bus or truck, or also a rail vehicle, a ship, an aircraft such as a helicopter or airplane, or for example, a bicycle.

According to a third aspect of the invention, a method for representing a panoramic view of the surroundings of a vehicle according to the second aspect of the invention is provided. The method comprises capturing an image of the surroundings of the vehicle by means of the real camera and projecting the image captured by the real camera onto the first plane which is perpendicular to the real camera such that perspective distortions in the image captured by the real camera resulting from the non-centered position of the real camera are distortion-corrected. Furthermore, the at least one geometric form is projected as an overlay onto the second plane which is perpendicular to the virtual camera such that the at least one geometric form is represented in an undistorted manner on the display unit. An affine transformation is further found between the first plane and the second plane by means of a delta transformation between the real camera and the virtual camera, and the found affine transformation is applied to the first plane which contains the projected and distortion-corrected image from the real camera captured by the real camera such that a modified representation of the distortion-corrected image (which is contained in the first plane) of the real camera is aligned with the at least one undistorted geometric form in the second plane.

According to a fourth aspect of the invention, a program element is provided, which, if it is run on a processor, instructs the processor to perform the method steps according to the method according to the third aspect of the invention.

According to a fifth aspect of the invention, a computer-readable medium is provided, on which a program element according to the fourth aspect of the invention is stored, which, if it is run on a processor, instructs the processor to perform the method steps according to the method according to the third aspect of the invention.

BRIEF DESCRIPTION OF THE DRAWINGS

Embodiment examples of the invention are explained in greater detail below with reference to the schematic drawing, wherein.

DETAILED DESCRIPTION OF EXAMPLE EMBODIMENTS OF THE INVENTION

Figure 1:
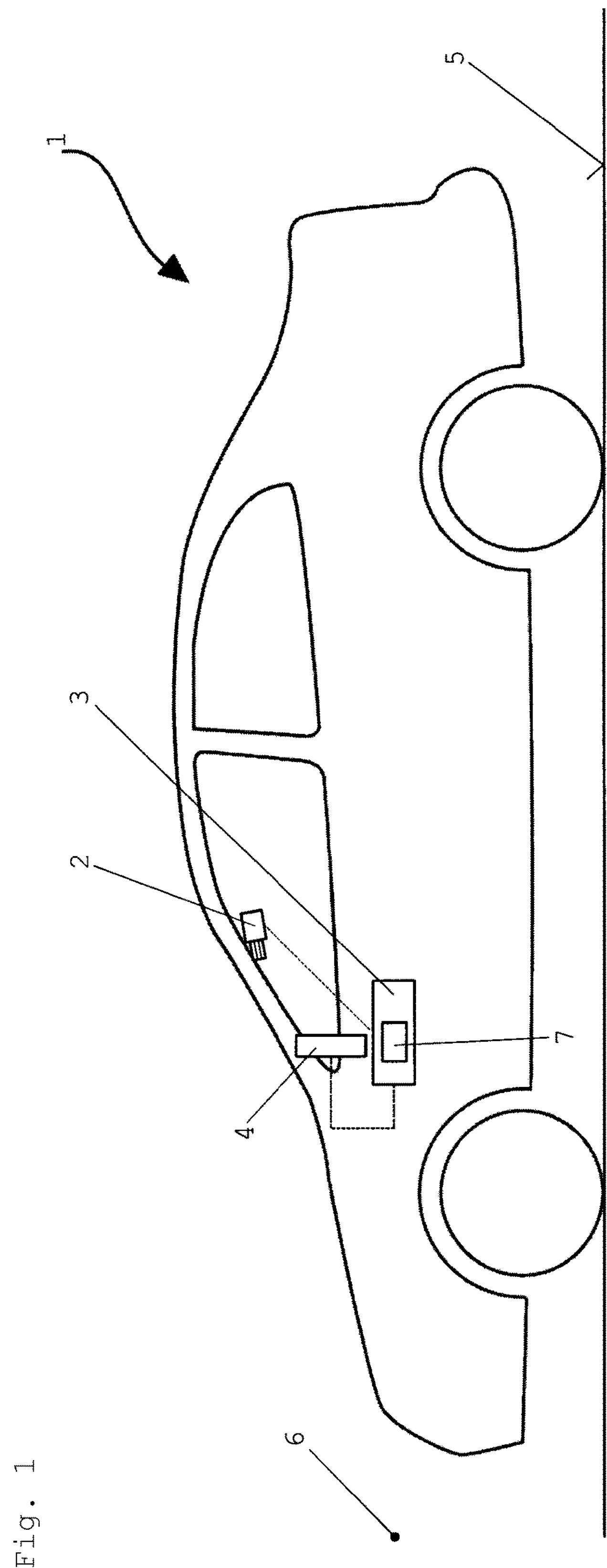
FIG. 1 shows a side view of a vehicle having one embodiment example of a panoramic view system according to the invention.
Figure 2:
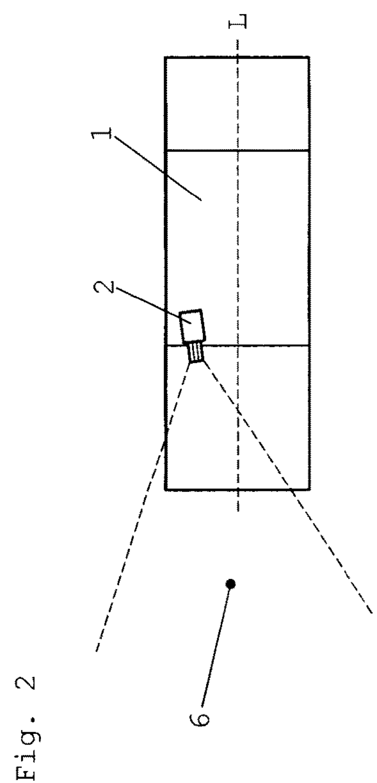
FIG. 2 shows a considerably simplified top view of the vehicle in accordance with FIG. 1.

FIGS. 1 and 2 show a vehicle 1 in the form of a motor vehicle. The vehicle 1 comprises at least one digital physical or real camera 2, an image processing unit 3 and a display unit 4 in the form of a monitor within the vehicle 1 in a field of vision of a user who is not shown. The image processing unit 3 is communicatively connected to the real camera 2 and to the display unit 4 such that the real camera 2 can transmit image data representing captured images to the image processing unit 3 which can, in turn, process the received image data and can transfer the processed image data to the display unit 4. Alternatively, the image processing unit 3 can also be integrated into the real camera 2 or the display unit 4.

The vehicle 1 is moving on a road 5 and the real camera 2 is mounted on the vehicle 1 in such a way that the real camera 2 can capture images of a region ahead 6 in the external surroundings of the vehicle 1. As can be seen from FIG. 2, the real camera 2 is mounted non-centrally on the vehicle 1. In FIG. 2, a longitudinal axis L of the vehicle 1 is represented, wherein the real camera 2 is mounted laterally offset next to the longitudinal axis L of the vehicle 1 on the vehicle 1. Furthermore, FIG. 2 shows that the real camera 2 can be mounted on the vehicle obliquely, i.e. not parallel to the longitudinal axis L of the vehicle 1. The real camera 2, the image processing unit 3 and the display unit 4 together form the panoramic view system of the vehicle 1, wherein the image processing unit 3 additionally produces a virtual camera 7 which does not exist.

Figure 3:
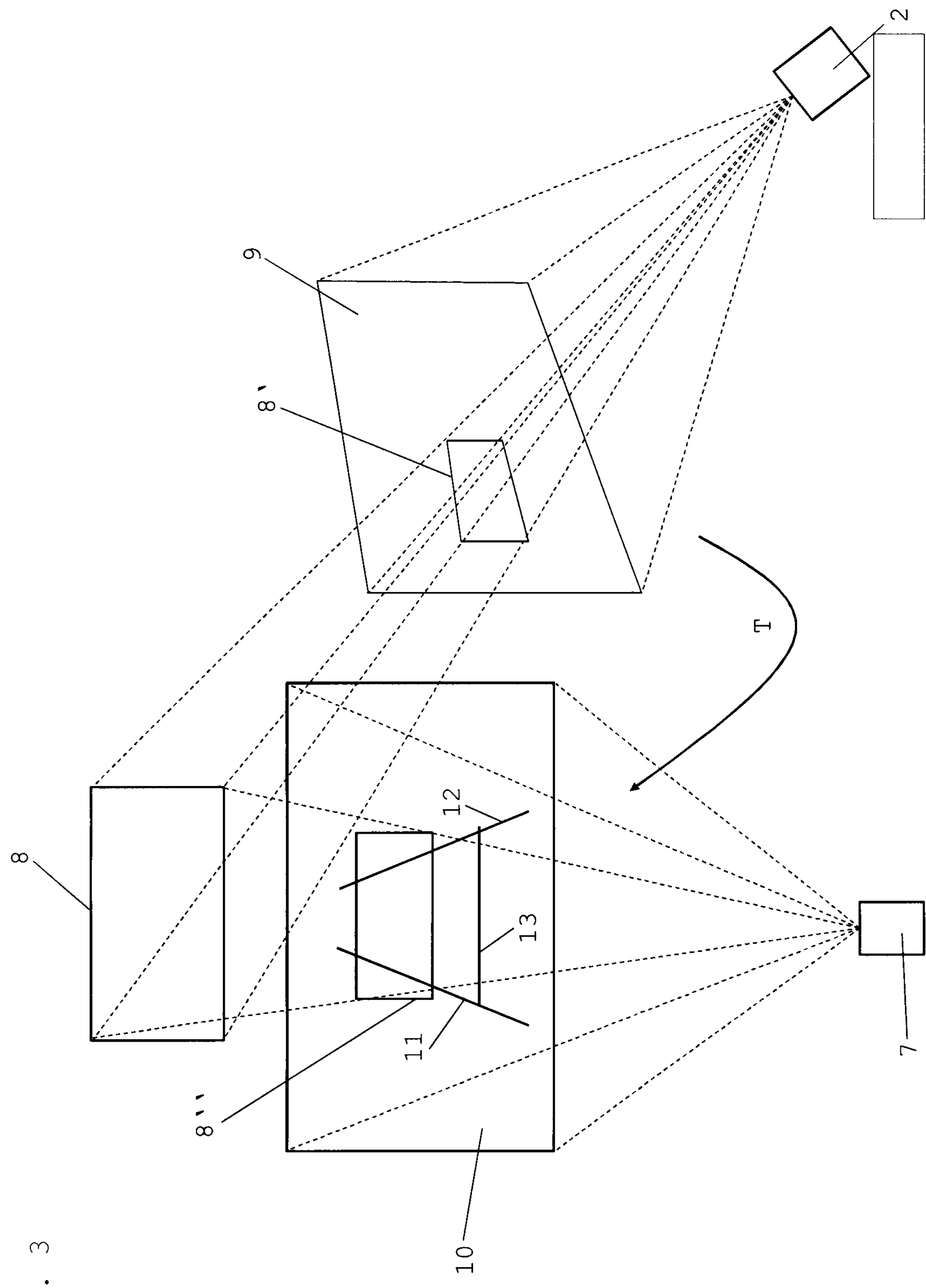
FIG. 3 shows a fundamental representation of a possible mode of Operation of the panoramic view system in accordance with FIG. 1.

FIG. 3 shows how an image of the surroundings 6 of the vehicle 1 captured by the real camera 2 can be processed, in order to be represented on the display unit 4 of the vehicle 1 in an all-round image of the vehicle 1. The image captured by the real camera 2 contains multiple objects, wherein one of these objects 8 is represented considerably schematically in FIG. 3. The object 8 can be, for example, a bumper of a further vehicle (not represented) in the region ahead of the vehicle 1. Although the mode of operation of the panoramic view system is explained below with reference to the object 8, these explanations equally apply to the remaining objects (not shown) which are contained in the image captured by the real camera 2.

The image captured by the real camera 2 having the object 8 is projected onto a first surface or plane 9 which is perpendicular to the real camera 2 such that perspective distortions in the image captured by the real camera 2 resulting from the non-centered position of the real camera 2 are distortion-corrected. In this way, a first modified representation 8' of the object 8 is created within the first plane 9. The image contents of the first plane 9 are not represented on the display unit 4 of the vehicle 1, but rather the image contents of a second plane 10 which is explained below.

The image processing unit 3 projects at least one geometric form 11 to 13 as an overlay onto the second plane 10 which is perpendicular to the virtual camera 7 such that the second plane 10 having the at least one geometric form 11 to 13 is represented in an undistorted manner on the display unit 4 of the vehicle 1. Three geometric forms which describe a planned trajectory of the vehicle 1 are shown by way of example in FIG. 3.

Furthermore, the image processing unit 3 finds an affine transformation T between the first plane 9 and the second plane 10 by means of a delta transformation between the real camera 2 and the virtual camera 7, and applies the found affine transformation T to the first plane 9 which contains the first modified representation 8' of the object 8. In this way, a second modified representation 8" of the object 8 is created within the second plane 10, wherein this second modified representation 8" is aligned with the at least one undistorted geometric form 11 to 13 in the second plane 10. The second plane having the modified representation 8" of the object 8 and the geometric forms 11 to 13 is represented on the display unit 4.

The invention claimed is:

1. A panoramic view system for a vehicle, the panoramic view system comprising at least one real camera configured to capture an image of surroundings of the vehicle from a non-centered position of the real camera relative to the vehicle, a virtual camera, an image processing unit, and a display unit, wherein the display unit is configured to represent, in a projected manner, the image captured by the real camera, and at least one geometric form as an overlay over the image captured by the real camera, as projected onto a second plane, and wherein the image processing unit is configured:

to project the image captured by the real camera onto a first plane that is perpendicular to the real camera so that perspective distortions in the image captured by the real camera resulting from the non-centered position of the real camera are distortion-corrected, to project the at least one geometric form as the overlay onto the second plane that is perpendicular to the virtual camera so that the at least one geometric form is represented in an undistorted manner on the display unit, to find an affine transformation between the first plane and the second plane by a delta transformation between the real camera and the virtual camera, and to apply the affine transformation to the first plane that contains the projected and distortion-corrected image captured by the real camera so that a modified representation of the distortion-corrected image captured by the real camera is aligned with the at least one undistorted geometric form in the second plane.

2. A vehicle comprising a vehicle body and the panoramic view system according to claim 1, wherein the real camera is mounted non-centrally on the vehicle body.

3. The panoramic view system according to claim 1, wherein the first plane is perpendicular to an optical axis of the real camera, and the second plane is perpendicular to a virtual optical axis of the virtual camera.

4. The panoramic view system according to claim 1, wherein the non-centered position of the real camera is a position at which the real camera is mounted on the vehicle and which is offset laterally non-centrally from a longitudinal axis of the vehicle.

5. The panoramic view system according to claim 1, wherein the non-centered position of the real camera is a position at which the real camera is mounted on the vehicle with an optical axis of the real camera oriented obliquely relative to a longitudinal axis of the vehicle.

6. The panoramic view system according to claim 1, wherein the virtual camera and the second plane are virtually arranged at respective centered positions relative to the vehicle.

7. A method of representing a panoramic view of surroundings of a vehicle, the method comprising the steps:

capturing an image of the surroundings of the vehicle with a real camera from a non-centered position of the real camera relative to the vehicle, projecting the image captured by the real camera onto a first plane that is perpendicular to the real camera so that perspective distortions in the image captured by the real camera resulting from the non-centered position of the real camera are distortion-corrected in a projected representation of the image on a display unit, projecting at least one geometric form as an overlay onto a second plane that is perpendicular to the virtual camera so that the at least one geometric form is represented in an undistorted manner on the display unit, finding an affine transformation between the first plane and the second plane by a delta transformation between the real camera and the virtual camera, and applying the affine transformation to the first plane that contains the projected and distortion-corrected image captured by the real camera so that a modified representation of the distortion-corrected image captured by the real camera is aligned with the at least one undistorted geometric form in the second plane, and displaying the modified representation and the at least one undistorted geometric form from the second plane on the display unit.

8. The method according to claim 7, wherein the first plane is perpendicular to an optical axis of the real camera, and the second plane is perpendicular to a virtual optical axis of the virtual camera.

9. The method according to claim 7, wherein the non-centered position of the real camera is a position at which the real camera is mounted on the vehicle and which is offset laterally non-centrally from a longitudinal axis of the vehicle.

10. The method according to claim 7, wherein the non-centered position of the real camera is a position at which the real camera is mounted on the vehicle with an optical axis of the real camera oriented obliquely relative to a longitudinal axis of the vehicle.

11. The method according to claim 7, wherein the virtual camera and the second plane are virtually arranged at respective centered positions relative to the vehicle.

12. A program element, which is stored in a non-transitory computer-readable medium and which, when executed by a processor, instructs the processor to perform the method according to claim 7.

13. A non-transitory computer-readable medium, on which is stored a program element, which, when executed by a processor, instructs the processor to perform the method according to claim 7.

* * * * *

UNITED STATES PATENT AND TRADEMARK OFFICE

CERTIFICATE OF CORRECTION

PATENT NO. : 10,904,432 B2
APPLICATION NO. : 16/469330
DATED : January 26, 2021
INVENTOR(S) : Georg Arbeiter et al.

It is certified that error appears in the above-identified patent and that said Letters Patent is hereby corrected as shown below:

On the Title Page

Item (73) Assignee:
Line 1, after "Conti" replace "Ternie" with --Temic--;

In the Specification

Column 2:
Line 41, before "of the real" replace "Plane)" with --plane)--;

Column 3:
Line 52, after "mode of" replace "Operation" with --operation--.

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*